United States Patent
Valenzuela-Rivas et al.

(10) Patent No.: US 10,576,768 B2
(45) Date of Patent: Mar. 3, 2020

(54) FRAME WITH TRANSPARENT PANEL

(71) Applicant: Hewlett-Packard Development Company, L.P., Spring, TX (US)

(72) Inventors: Rene Valenzuela-Rivas, San Diego, CA (US); Ryan M Smith, San Diego, CA (US); Christopher J Quijano, Boise, ID (US); Craig L Hopper, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/331,272

(22) PCT Filed: Sep. 12, 2016

(86) PCT No.: PCT/US2016/051398
§ 371 (c)(1),
(2) Date: Mar. 7, 2019

(87) PCT Pub. No.: WO2018/048458
PCT Pub. Date: Mar. 15, 2018

(65) Prior Publication Data
US 2019/0217643 A1   Jul. 18, 2019

(51) Int. Cl.
| *H04N 1/00* | (2006.01) |
| *B41L 47/02* | (2006.01) |
| *H04N 1/04* | (2006.01) |
| *B41L 47/00* | (2006.01) |

(52) U.S. Cl.
CPC ............... *B41L 47/02* (2013.01); *B41L 47/00* (2013.01); *H04N 1/00* (2013.01); *H04N 1/00519* (2013.01); *H04N 1/00557* (2013.01); *H04N 1/04* (2013.01); *H04N 2201/0081* (2013.01); *H04N 2201/0094* (2013.01)

(58) Field of Classification Search
CPC .. H04N 1/00; H04N 1/00519; H04N 1/00557; H04N 5/64; H04N 5/7441; H04N 9/3144; H04N 1/00562; H04N 1/04; H04N 1/1065; H04N 2201/0434; H04N 2201/0456; H04N 9/3105; H04N 9/3141
USPC ......................................................... 358/474
See application file for complete search history.

(56) References Cited

U.S. PATENT DOCUMENTS

| 6,481,626 B1 * | 11/2002 | Nahar ................ G06K 7/10871 |
| | | 235/462.14 |
| 6,587,231 B1 * | 7/2003 | Sung .................... H04N 1/0405 |
| | | 250/208.1 |
| 6,637,897 B2 | 10/2003 | Tsai et al. |
| 6,661,537 B1 | 12/2003 | Khovaylo |
| 6,661,538 B1 | 12/2003 | Takeuchi |
| (Continued) | | |

*Primary Examiner* — Negussie Worku
(74) *Attorney, Agent, or Firm* — HP Inc. Patent Department

(57) ABSTRACT

Examples disclosed herein relate to a device including a frame with a transparent panel. In examples, the device includes a frame defining an opening of a scanner subassembly, the frame including a first side and a second side in contact with the first side; and a transparent panel coupled to the frame to cover the opening, a first side of the transparent panel disposed to be substantially planar with a first side of the frame, and a second side of the transparent panel disposed to be substantially planar with the second side of the frame.

16 Claims, 10 Drawing Sheets

(56) References Cited

U.S. PATENT DOCUMENTS

| | | | |
|---|---|---|---|
| 7,580,163 B2 * | 8/2009 | Wang | H04N 1/00241 |
| | | | 358/471 |
| 7,961,363 B2 | 6/2011 | Tsujimoto et al. | |
| 8,547,603 B2 | 10/2013 | Shilling | |
| 2004/0201792 A1 * | 10/2004 | Saitoh | G02F 1/133382 |
| | | | 349/58 |
| 2004/0252253 A1 * | 12/2004 | Miyashita | G02F 1/133308 |
| | | | 349/58 |
| 2014/0029066 A1 * | 1/2014 | Liu | H04N 1/04 |
| | | | 358/474 |
| 2014/0376757 A1 * | 12/2014 | Engle | H04N 5/64 |
| | | | 381/333 |
| 2016/0017649 A1 | 1/2016 | Akahane | |
| 2016/0320545 A1 * | 11/2016 | Hirayama | G02B 6/0038 |
| 2019/0257998 A1 * | 8/2019 | Sugiyama | G02B 6/0051 |

* cited by examiner

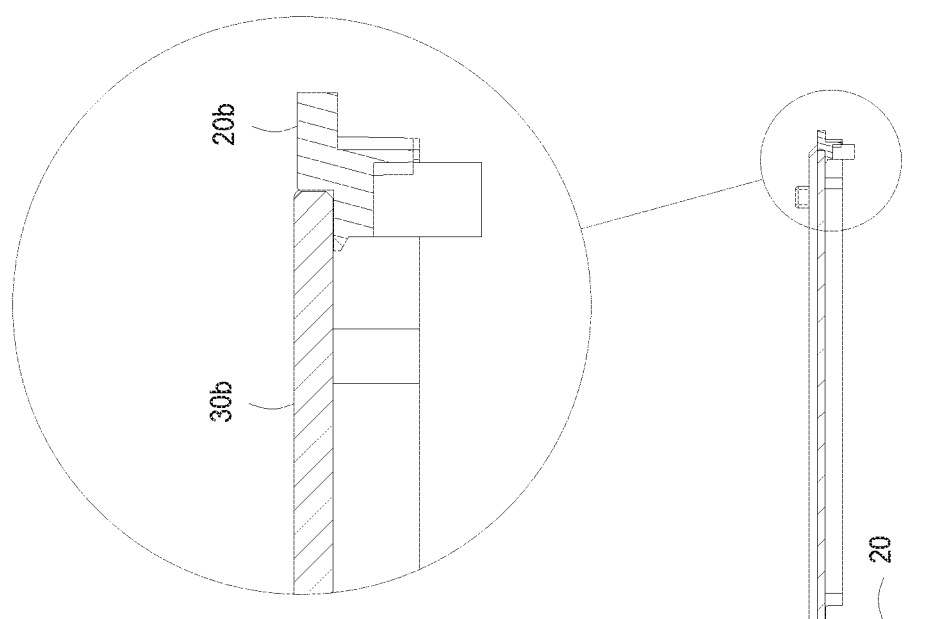
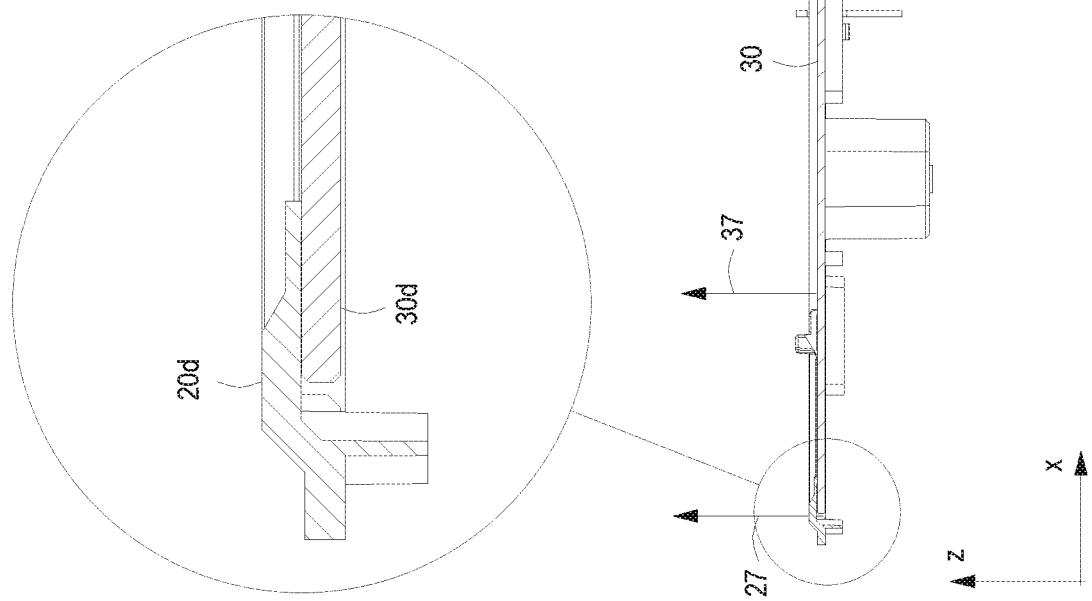
FIG. 6

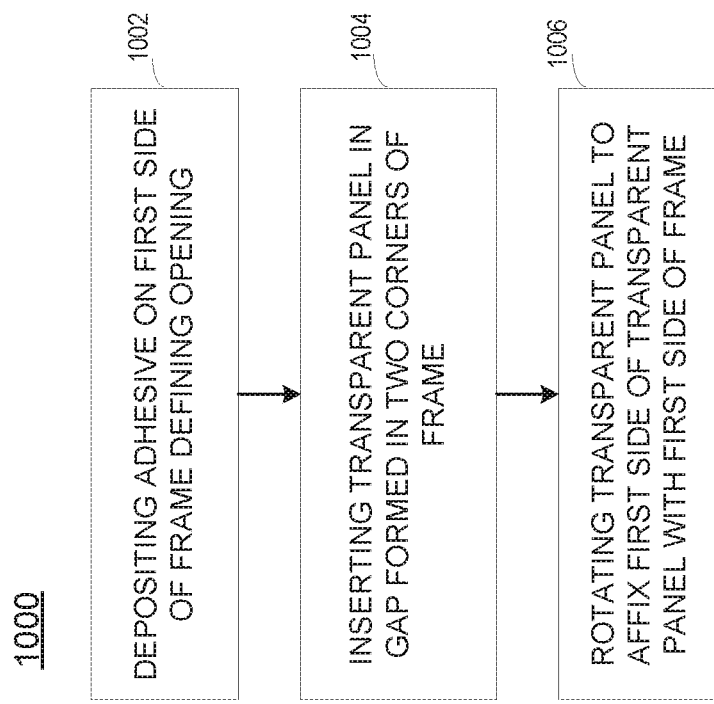

FRAME WITH TRANSPARENT PANEL

BACKGROUND

Imaging devices—including scanners, copiers, facsimile machines, multifunction printers, all-in-one devices, or other devices—convert physical objects (e.g., documents, photographs, etc.) into electronic data. In some examples, imaging devices can include a surface to receive objects to be imaged by a scanner.

BRIEF DESCRIPTION OF THE DRAWINGS

The following detailed description references the drawings, wherein:

FIG. 6 is a cross-sectional view of the device of FIG. 5 taken along line 6-6' according to an example.

FIG. 10 is a flow diagram illustrating a method for installing a transparent panel in a frame according to an example.

DETAILED DESCRIPTION

An imaging device may include a surface to receive objects for imaging. In examples, a flatbed scanner may include a surface to receive media for imaging and may be coupled to a lid to cover the media during imaging. A user interacting with a flatbed scanners may seek to remove the media by sliding it across the receiving surface of the flatbed scanner. However, an edge of the flatbed scanner surrounding the receiving surface may be higher than the receiving surface interfering with a user removing the medium.

To address these issues, in the examples described herein, a device in which two sides of a frame are disposed to be substantially planar with sides of a transparent panel to receive objects for imaging is described. In the examples, the edges of the device disposed to be parallel with the transparent panel are disposed to be in a front portion and side portion of the device from which a user may remove an object being imaged (e.g., a medium).

Accordingly, the present specification describes, in one example, a device that includes a frame defining an opening of a scanner sub-assembly, the frame including a first side and a second side in contact with the first side; and a transparent panel coupled to the frame to cover the opening, a first side of the transparent panel disposed to be substantially planar with a first side of the frame, and a second side of the transparent panel disposed to be substantially planar with the second side of the frame.

In another example, the present specification describes a process for installing a transparent panel in a frame that includes depositing adhesive on a first side of the frame defining an opening; inserting transparent panel in a gap formed in two corners of the frame; and rotating the transparent panel to affix a first side of the transparent panel with the first side of the frame, a second side of the transparent panel and a third side of the transparent panel to be substantially planar with the frame.

In yet another example, the present specification describes an imaging device that includes a frame defining an opening, the frame including a first side and a second side in contact with the first side; a transparent panel affixed to the frame to cover the opening, a first side of the transparent panel disposed to be substantially planar with a first side of the frame, and a second side of the transparent panel disposed to be substantially planar with the second side of the frame; and an adhesive layer disposed between a third side of the frame and a third side of the transparent panel, the third side of the transparent panel spaced apart from the first side of the transparent panel and the second side of the transparent panel.

Figure 1:
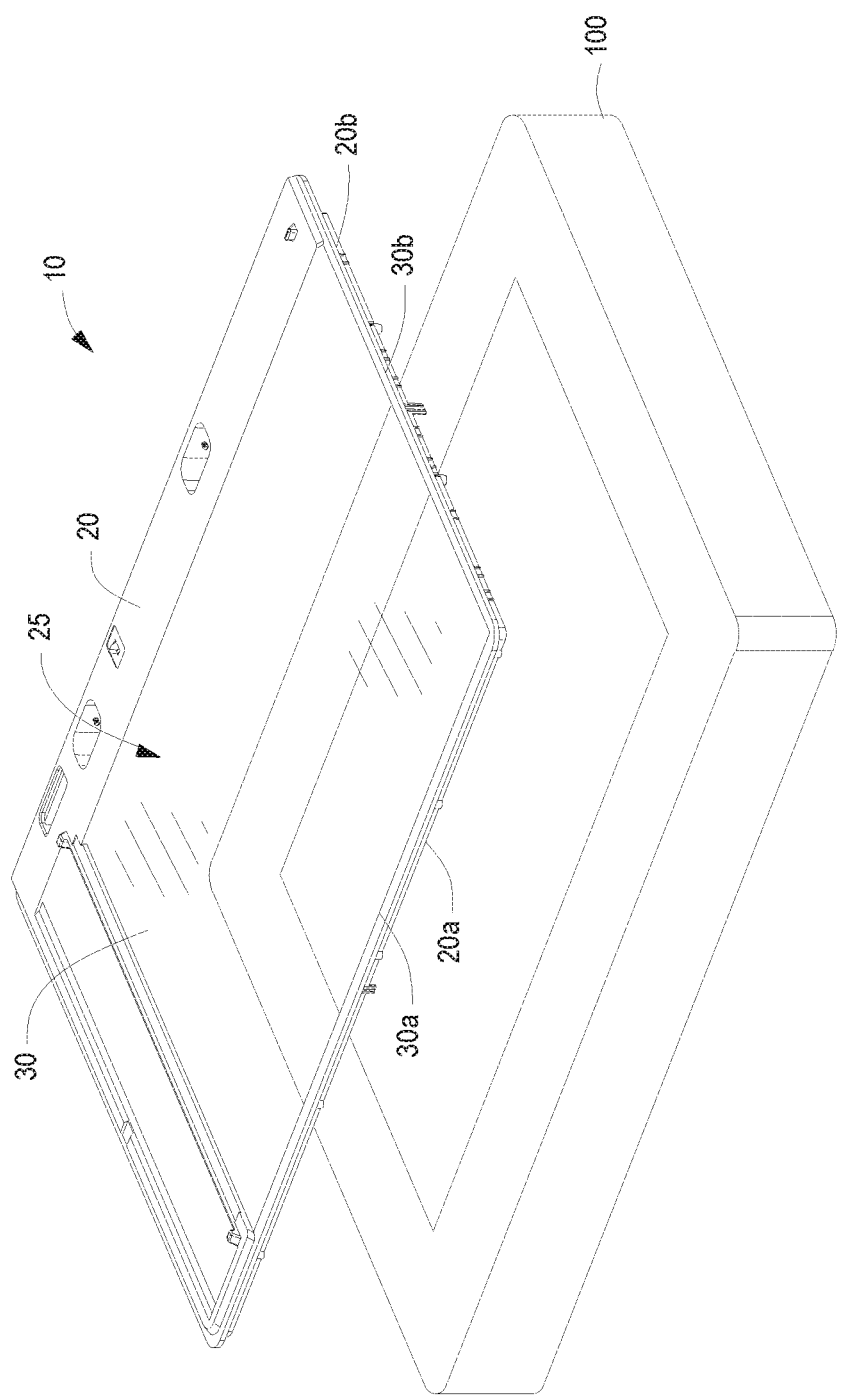
FIG. 1 is a partial schematic exploded view of a device according to an example.
Figure 2:
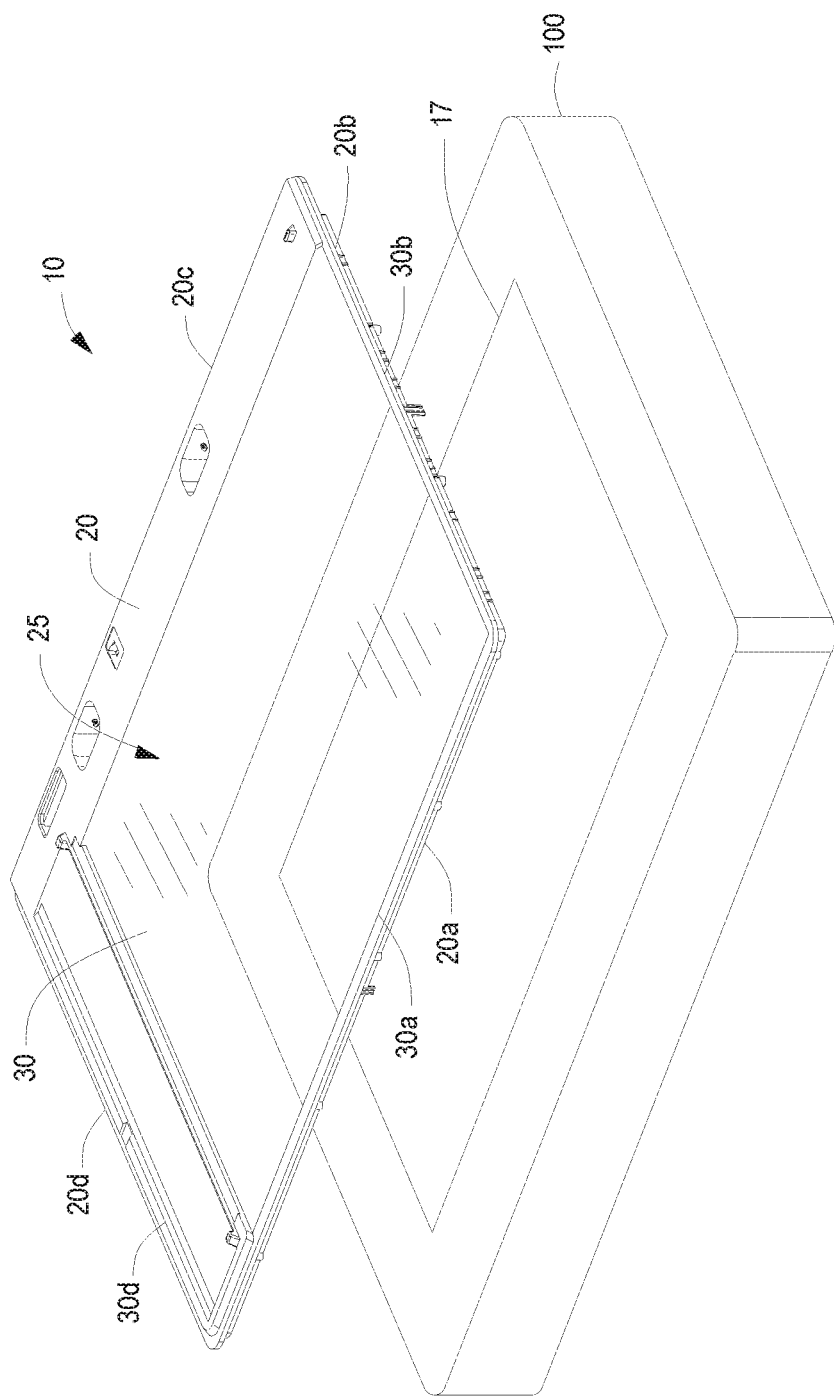
FIG. 2 is a partial schematic exploded view of the device of FIG. 1 according to an example.
Figure 3:
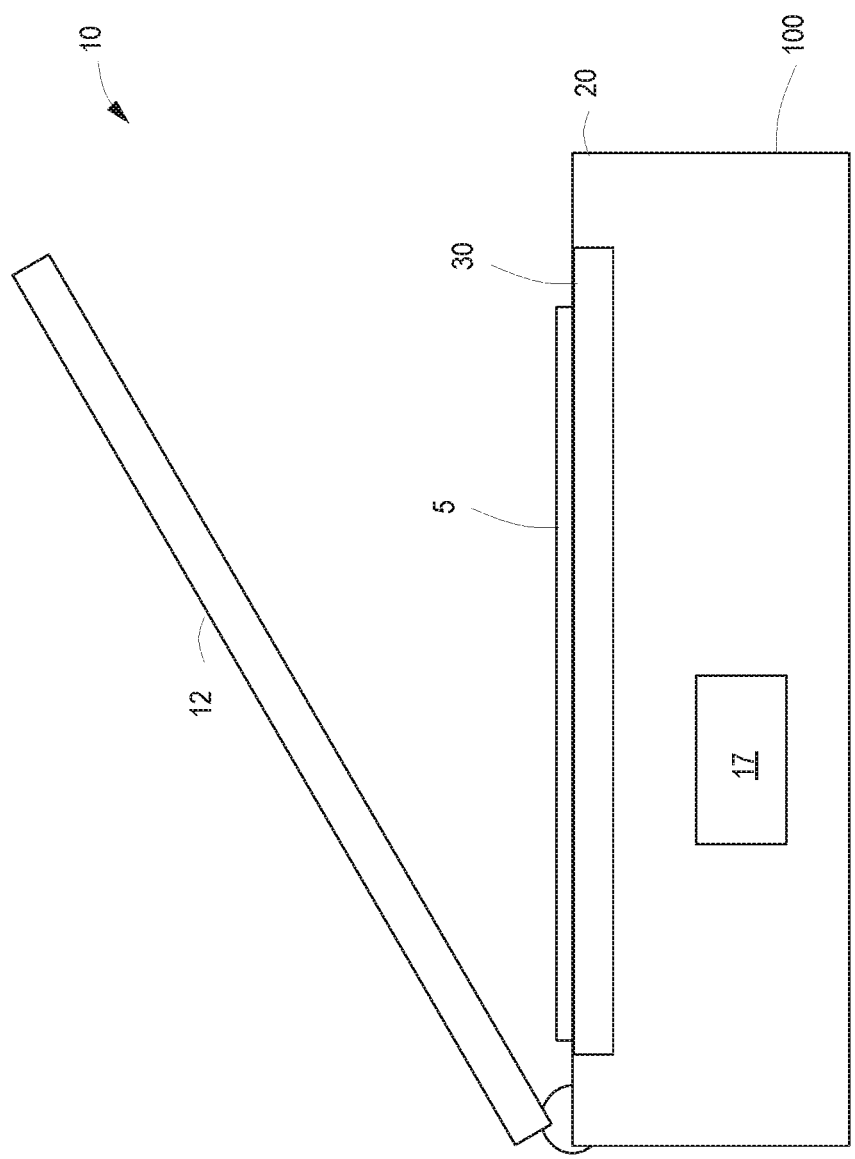
FIG. 3 is a schematic view of the device of FIG. 1 according to an example.
Figure 4:
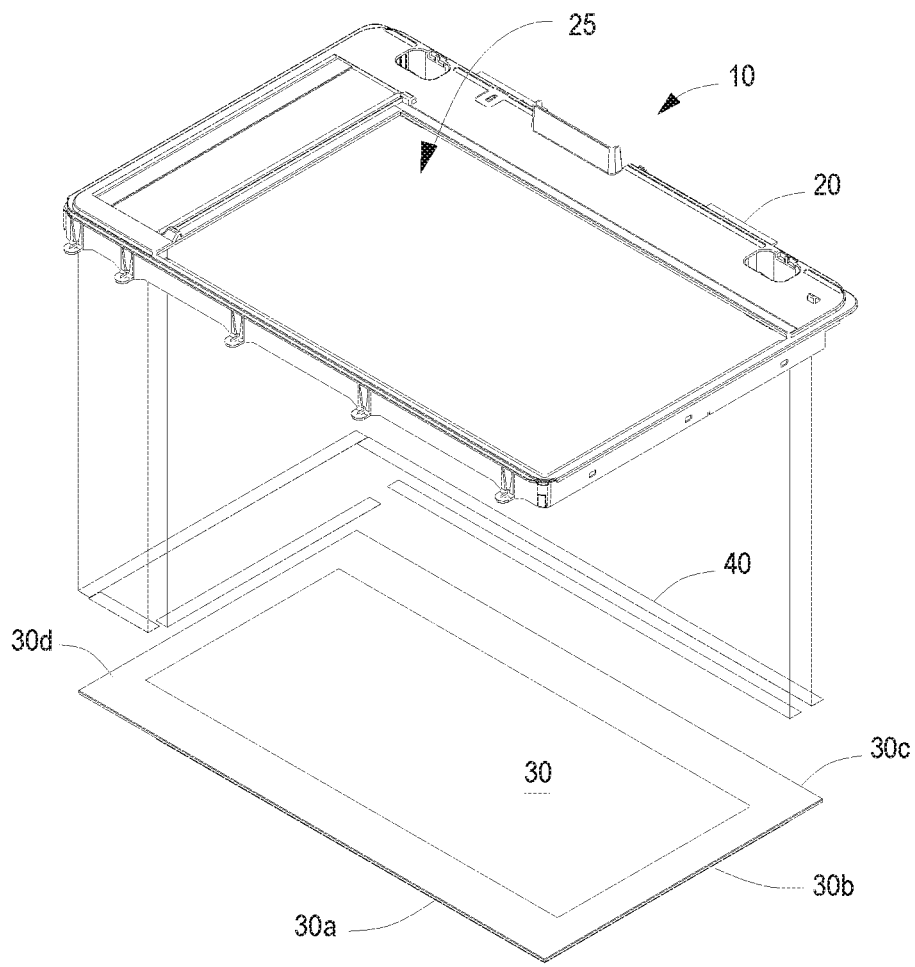
FIG. 4 is a partial exploded view of the device of FIG. 1 according to an example.
Figure 5:
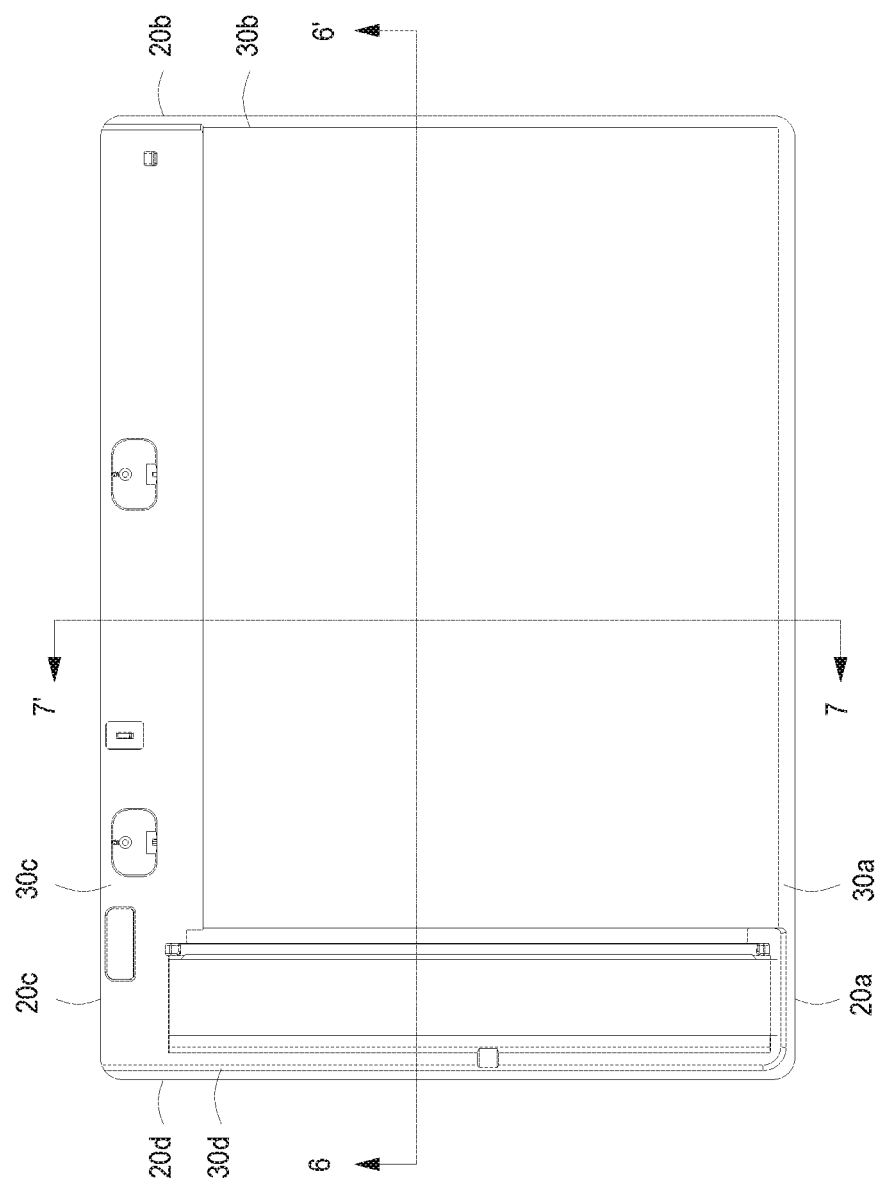
FIG. 5 is a partial top view of the device of FIG. 1 according to an example.
Figure 7:
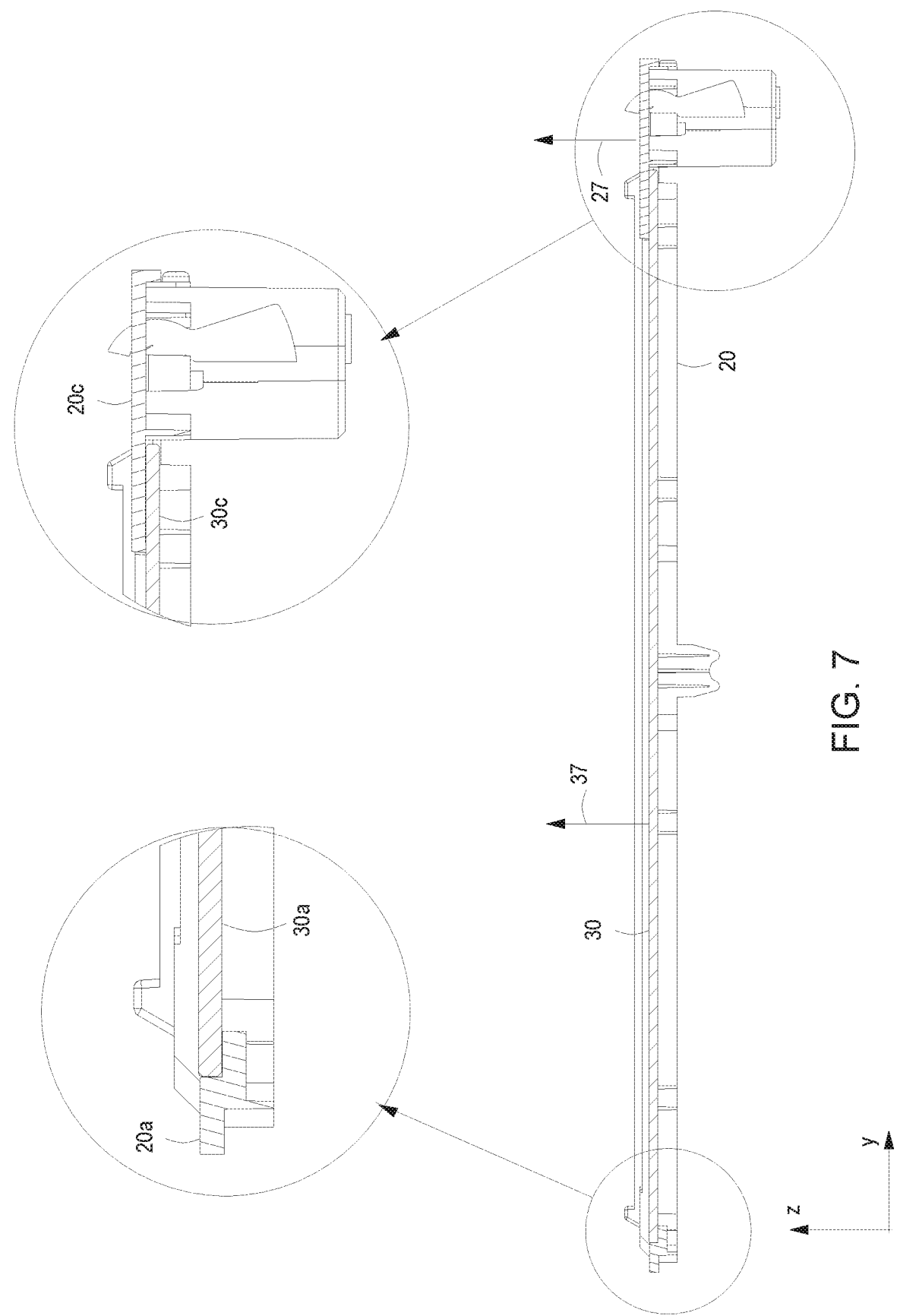
FIG. 7 is a cross-sectional view of the device of FIG. 5 taken along line 7-7' according to an example.
Figure 8:
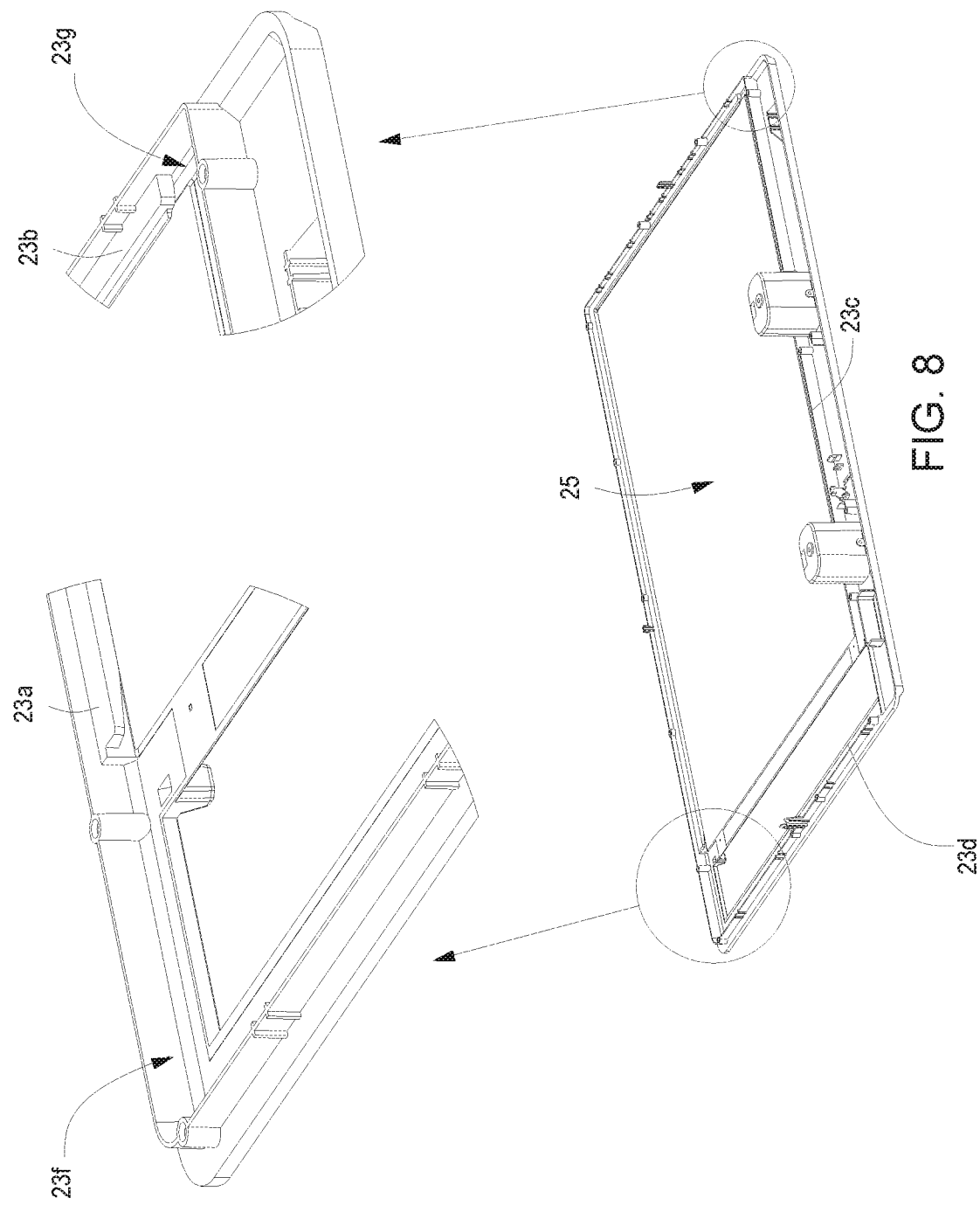
FIG. 8 is a bottom view of the frame of the device of FIG. 1 according to an example.
Figure 9:
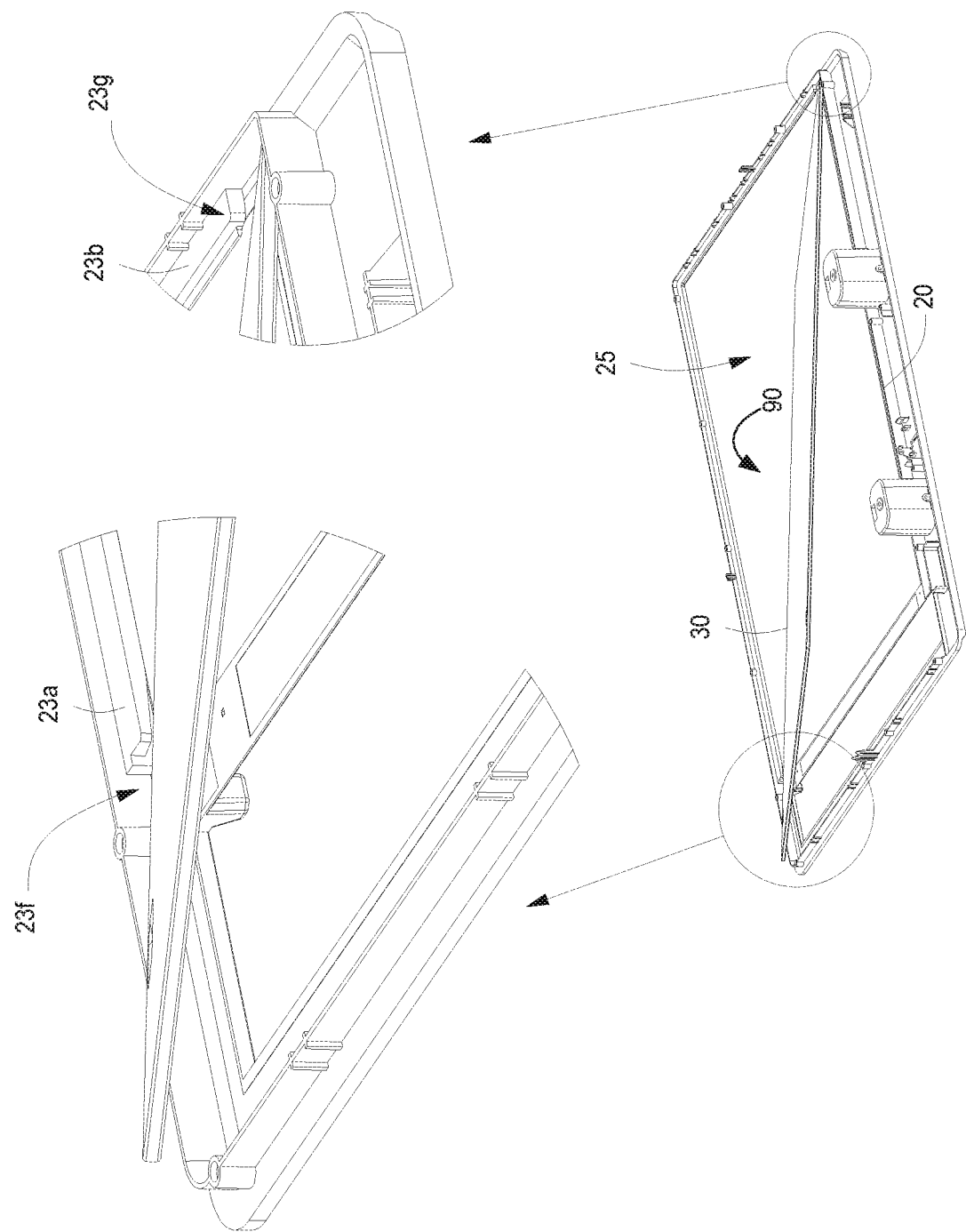
FIG. 9 is a bottom view of the installation of the transparent panel into the frame of the device of FIG. 1 according to an example.

Referring now to the drawings, FIG. 1 is a partial schematic exploded view of a device 10 according to an example. FIG. 2 is a partial schematic exploded view of device 10 of FIG. 1 according to an example. FIG. 3 is a schematic view of device 10 of FIG. 1 according to an example. FIG. 4 is a partial exploded view of device 10 of FIG. 1 according to an example. FIG. 5 is a partial top view of device 10 of FIG. 1 according to an example. FIG. 6 is a cross-sectional view of device 10 of FIG. 5 taken along line 6-6' according to an example. FIG. 7 is a cross-sectional view of device 10 of FIG. 5 taken along line 7-7' according to an example. FIG. 8 is a bottom view of the frame of device 10 of FIG. 1 according to an example. FIG. 9 is a bottom view of the installation of the transparent panel into the frame of device 10 of FIG. 1 according to an example. The example device 10 includes a frame 20 and a transparent panel 30. In examples, device 10 further includes an adhesive layer 40, a scanner sub-assembly 100, a lid 12, and a scanner 17. In examples, a medium 5 may be placed on transparent panel 30 to be imaged by scanner 17. In examples, medium 5 may be any physical object.

The device 10 may have a scanner sub-assembly 100 on which a transparent panel 30 may be positioned. For example, transparent panel 30 may be coupled to a frame 20 and be disposed to form an upper section of scanner sub-assembly 100. In the following discussion and in the claims, the term "couple" or "couples" is intended to include suitable indirect and/or direct connections. Thus, if a first component is described as being coupled to a second component, that coupling may, for example, be: (1) through a direct electrical or mechanical connection, (2) through an indirect electrical or mechanical connection via other devices and connections, (3) through an optical electrical connection, (4) through a wireless electrical connection, and/or (5) another suitable coupling. The term "connect" or "connected" is intended to include suitable direct connections. In examples, device 10 may also include a lid 12 that is rotatably mounted to scanner sub-assembly 100. In the example of FIG. 3, lid 12 is depicted as being in an open position in which the lid 12 is extended away from transparent panel 30. In examples, lid 12 may also be moved to a closed position in which the lid 12 covers the transparent panel 30, for instance, to block ambient light from entering into the scanner sub-assembly 100 through the transparent panel 30.

In examples, device 10 may be any imaging device to image a document disposed thereon. An "imaging device" may be a hardware device, such as a scanner, copier, multifunction printer (MFP), or any other device with functionalities to produce electronic data representing physical objects. In some examples, an MFP may be capable of performing a combination of multiple different functionalities such as, for example, printing, photocopying, scanning, faxing, etc. In examples, medium 5 may be any type of paper, photopolymers, thermopolymers, plastics, fabric, composite, metal, wood, etc., which may be disposed on transparent panel 30 of device 10.

In examples, scanner 17 may be a hardware component to scan a physical object to produce electronic representations of the object. In examples, scanner 17 may scan or image a variety of physical objects placed in a scan zone of the scanner. In examples, scanner 17 may remain stationary to image an object. In other examples, scanner 17 may traverse the scan zone to image an object.

In examples, frame 20 may be a structure which encloses or defines an opening 25. In examples, frame 20 may include side 20a, side 20b, side 20c, and side 20d to enclose opening 25. Although depicted with four sides, frame 20 is not limited thereto and can have any number of sides without departing from the scope of this present disclosure. In examples, side 20a may be disposed opposite side 20c such that side 20a and side 20c may not intersect with each other. Similarly, side 20b may be disposed opposite side 20d such that side 20b and side 20d may not intersect with each other. In such an example, side 20a may be substantially perpendicular to side 20b and side 20d. Similarly, side 20c may be substantially perpendicular to side 20b and 20d. In examples, frame 20 may be disposed such that opening 25 is disposed over scanner 17. In examples, frame 20 and transparent panel 30 may be disposed to form an upper surface of scanner sub-assembly 100. In examples, frame 20 may be composed of any material to retain transparent panel 30, such as, a composite, a metal, a wood, etc. In examples, frame 20 may be a single piece. In such an example, frame 20 may be manufactured using any manufacturing technology to produce a single non-joined object, such as, injection molding, die casting, extruding, 3-D printing, etc. In other examples, frame 20 may be composed of multiple components coupled together.

In examples, a transparent panel 30 may be disposed to cover a scan zone of scanner 17 while coupled to frame 20. In examples, transparent panel 30 may be composed of any ridged transparent material with structural integrity to support an object being imaged. In examples, transparent panel 30 may be a glass, a plexi-glass, a transparent plastic, etc. In examples, transparent panel 30 may include side 30a, side 30b, side 30c, and side 30d. In examples, side 30a of transparent panel 30 may be disposed adjacent to side 20a of frame 20. In examples, side 30b of transparent panel 30 may be disposed adjacent to side 20b of frame 20. In examples, side 30c of transparent panel 30 may be disposed adjacent to side 20c of frame 20. In examples, side 30d of transparent panel 30 may be disposed adjacent to side 20d of frame 20.

In examples, frame 20 may retain transparent panel 30 over opening 25. In such example, frame 20 may include a number of rails on which transparent panel 30 may be disposed. In examples, rail 23a, rail 23b, rail 23c, and rail 23d may be disposed on frame 20 to retain transparent panel 30. In examples, rail 23a may be disposed along an inner portion of side 20a. In examples, rail 23a may be dimensioned to be shorter than a length of side 20a. In examples, rail 23b may be disposed along an inner portion of side 20b. In examples, rail 23b may be dimensioned to be shorter than a length of side 20b. In examples, rail 23c may be disposed along an inner portion of side 20c. In examples, rail 23c may be dimensioned to be shorter than a length of side 20c. In examples, rail 23d may be disposed along an inner portion of side 20d. In examples, rail 23d may be dimensioned to be shorter than a length of side 20d. In examples, rail 23a and rail 23d may be disposed to form a gap 23f at intersections of side 20a and side 20d, in other words a corner of frame 20, as depicted in FIG. 8. In examples, rail 23b and rail 23c may be disposed to form a gap 23g at intersections of side 20b and side 20c, in other words a corner of frame 20, as depicted in FIG. 8. In examples, gap 23f and gap 23g may be formed at diagonally opposed corners of frame 20.

In examples, rail 23a may be disposed such that side 30a of transparent panel 30 may be disposed to be substantially planar with side 20a of frame 20 as shown in FIG. 7. In contrast, rail 23c may be disposed such that side 30c of transparent panel 30 may be disposed to be lower than or below side 20c of frame 20 in the z-direction. In examples, rail 23b may be disposed such that side 30b of transparent panel 30 may be disposed to be substantially planar with side 20b of frame 20 as shown in FIG. 6. In contrast, rail 23d may be disposed such that side 30d of transparent panel 30 may be disposed to be lower than side 20d of frame 20 in the z-direction. In such examples, a normal 27 of frame 20 may be substantially parallel to a normal 37 of transparent panel 30. In other words, transparent panel 30 remains flat relative to the z-axis when coupled to frame 20 while allowing at least two sides of transparent panel 30 to be substantially flush with sides of frame 20. In such examples, a user may not encounter a barrier when removing medium 5 from device 10 along the two sides. In examples, the two sides of transparent panel 30 substantially flush with the side of frame 20 may be disposed in a front side and a right side of device 10. In other examples, the two sides of transparent panel 30 substantially flush with the side of frame 20 may be disposed in a front side and a left side of device 10.

In examples, an adhesive layer 40 may be disposed to affix transparent panel 30 to frame 20. In such an examples, adhesive layer 40 may affix side 30c to side 20c and side 30d to side 20d. In examples, adhesive layer 40 may be any type of adhesive to couple a transparent panel 30 to a frame 20.

FIG. 10 is a flowchart of an example method 1000 for installing transparent panel 30 in frame 20 according to an example. Although execution of method 1000 is described below with reference to device 10 described above, other suitable systems for the execution of method 1000 can be utilized. Additionally, implementation of method 1000 is not limited to such examples.

At 1002 of method 1000, an adhesive layer 40 is deposited on a side 20c of frame 20.

At 1004, transparent panel 30 is inserted into gap 23f and gap 23g formed in two corners of frame 20 as shown in FIG. 8 and FIG. 9.

At 1006, transparent panel 30 is rotated to affix side 30c to side 20c of frame 20 along arrow 90, as shown in FIG. 9. In such an example, once rotated into a final position side 30a and side 30b of transparent panel 30 are disposed to be substantially planar with side 20a and side 20b, respectively, of frame 20.

While certain implementations have been shown and described above, various changes in form and details may be made. For example, some features that have been described in relation to one implementation and/or method can be related to other implementations. In other words, processes, features, components, and/or properties described in relation to one implementation can be useful in other implementations. Furthermore, it should be understood that the systems, apparatuses, and methods described herein can include various combinations and/or sub-combinations of the components and/or features of the different implementations described. Thus, features described with reference to one or more implementations can be combined with other implementations described herein.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A device comprising:
a frame defining an opening of a scanner sub-assembly, the frame including a first side, a second side adjacent to the first side, a third side adjacent to the second side, and a fourth side adjacent to the third side and the first side; and
a transparent panel coupled to the frame to cover the opening, the transparent panel including a first side, a second side adjacent to the first side, a third side adjacent to the second side, and a fourth side adjacent to the third side and the first side,
wherein the first, second, third, and fourth sides of the transparent panel are respectively affixed to the first, second, third, and fourth sides of the frame, and
wherein the first side and the second side of the transparent panel are not respectively covered by the first side and the second side of the frame, and the third side and the fourth side of the transparent panel are respectively covered by a portion of the third side and a portion of the fourth side of the frame.

2. The device of claim 1, further comprising:
an adhesive layer disposed to affix the transparent panel to the frame, the adhesive layer disposed between the third side of the frame and the third side of the transparent panel, and between the fourth side of the frame and the fourth side of the transparent panel.

3. The device of claim 1, wherein the frame further comprises rails to retain the transparent panel, including a first rail disposed along an inner portion of the first side of the frame, a second rail disposed along an inner portion of the second side of the frame, a third rail disposed along an inner portion of the third side of the frame, and a fourth rail disposed along an inner portion of fourth side of the frame.

4. The device of claim 3, wherein the first, second, third, and fourth rails are respectively shorter than the first, second, third, and fourth sides of the frame such that a first gap is formed at a first corner of the first rail and the fourth rail, and a second gap is formed at a second corner of the second rail and the third rail.

5. The device of claim 1, further comprising:
a scanner to image an object disposed on the transparent panel.

6. The device of claim 1, wherein a normal of the transparent panel is parallel to a normal of the frame.

7. The device of claim 1, wherein the frame is a single piece.

8. The device of claim 1, wherein the first side and the second side are substantially perpendicular to each other.

9. A process for installing a transparent panel in a frame, wherein the frame includes an opening defined by a first side, a second side, a third side, and a fourth side, the process comprising:
depositing adhesive on the first side and the second side of the frame;
inserting two diagonally opposite corners of the transparent panel in a first gap and a second gap formed in two diagonally opposite corners of the opening of the frame; and
rotating the transparent panel to affix, by the adhesive, a first side of the transparent panel to the first side of the frame and a second side of the transparent panel to the second side of the frame, wherein the first side and the second side of the transparent panel are respectively covered by a portion of the first side and a portion of the second side of the frame, and a third side and a fourth side of the transparent panel are not covered by the third side and the fourth side of the frame, and wherein the third side of the transparent panel is adjacent to the fourth side of the transparent panel.

10. The process of claim 9, wherein the adhesive is deposited on an underside of the first side and an underside of the second side of the frame, the second side substantially perpendicular to the first side of the frame.

11. The process of claim 9, wherein the third and fourth sides of the transparent panel are affixed to the third and fourth sides of the frame by rails that are disposed along inner portions of the third and fourth sides of the frame.

12. The process of claim 9, wherein a normal of the transparent panel is parallel to a normal of the frame.

13. An imaging device, comprising:
a frame including an opening defined by a first side, a second side, a third side, and a fourth side;
a transparent panel including a first side, a second side, a third side, and a fourth side respectively affixed to the first, second, third, and fourth sides of the frame to cover the opening, wherein the first side and the second side of the transparent panel are not respectively covered by the first side and the second side of the frame, and the third side and the fourth side of the transparent panel are respectively covered by a portion of the third side and a portion of the fourth side of the frame, and wherein the third side of the transparent panel is adjacent to the fourth side of the transparent panel; and
an adhesive layer disposed between the third side of the frame and the third side of the transparent panel, and between the fourth side of the frame and the fourth side of the transparent panel.

14. The imaging device of claim 13, wherein a normal of the transparent panel is parallel to a normal of the frame.

15. The imaging device of claim 13, wherein the frame further comprises rails to retain the transparent panel, including a first rail disposed along an inner portion of the first side of the frame, a second rail disposed along an inner portion of the second side of the frame, a third rail disposed along an inner portion of the third side of the frame, and a fourth rail disposed along an inner portion of fourth side of the frame.

16. The imaging device of claim 15, wherein the first, second, third, and fourth rails are respectively shorter than the first, second, third, and fourth sides of the frame such that a first gap is formed at a first corner of the first rail and the fourth rail, and a second gap is formed at a second corner of the second rail and the third rail.

* * * * *